US005850934A

United States Patent [19]

Kumar

[11] Patent Number: 5,850,934

[45] Date of Patent: Dec. 22, 1998

[54] PRESSURE VESSEL SEAL WITH SELF-ENERGIZING SEAL

[76] Inventor: M. Lalith Kumar, 457 Dover Dr., Pittsburgh, Pa. 15238

[21] Appl. No.: 897,879

[22] Filed: Jul. 21, 1997

Related U.S. Application Data

[63] Continuation of Ser. No. 734,406, Oct. 16, 1996, abandoned, which is a continuation of Ser. No. 175,966, Dec. 30, 1993, abandoned.

[51] Int. Cl.$^{6}$ .............................. F17G 13/06; F16J 13/00

[52] U.S. Cl. .......................... 220/582; 220/211; 220/239; 220/240

[58] Field of Search .................................... 215/270, 308; 220/211, 239, 240, 582, 583; 277/205

[56] References Cited

U.S. PATENT DOCUMENTS

| | | | |
|---|---|---|---|
| 1,563,112 | 11/1925 | Slate | 220/240 |
| 1,732,235 | 10/1929 | Joyce | 220/582 |
| 1,904,250 | 4/1933 | Purvis | 220/240 |
| 2,001,458 | 5/1935 | Dunn | 220/304 |
| 2,016,223 | 10/1935 | Bowers | 220/240 |
| 2,016,227 | 10/1935 | Clausen | 220/240 |
| 2,511,386 | 6/1950 | Warren | 277/205 |
| 2,705,177 | 3/1955 | Waring | 277/205 |
| 2,781,943 | 2/1957 | Strom | 220/239 |
| 2,835,404 | 5/1958 | Andrus | 220/582 |
| 2,877,921 | 3/1959 | Grim | 220/211 |
| 2,967,744 | 1/1961 | Davies | 220/240 |
| 3,258,151 | 6/1966 | Gasche | 220/240 |
| 3,326,560 | 6/1967 | Trbovich | 277/205 |
| 3,419,180 | 12/1968 | Homrig | 220/239 |
| 3,430,801 | 3/1969 | Homrig | 220/240 |
| 4,709,831 | 12/1987 | Coplan | 220/304 |
| 5,036,996 | 8/1991 | Epstein | 220/240 |
| 5,193,703 | 3/1993 | Staats, III | 220/240 |
| 5,320,238 | 6/1994 | Verdesca | 220/240 |

FOREIGN PATENT DOCUMENTS

| | | | |
|---|---|---|---|
| 0452603 | 10/1991 | European Pat. Off. | 220/240 |
| 0065432 | 5/1980 | Japan | 220/211 |

OTHER PUBLICATIONS

Fluid Power Design Handbook, Second Edition, Frank Yeaple, 1990 Copyright.

*Primary Examiner*—Randall E. Chin
*Attorney, Agent, or Firm*—Ansel M. Schwartz

[57] ABSTRACT

The present invention is a pressure vessel device. The device is comprised of a vessel body having an open end. The device also comprises an end cap disposed on the open end of the body. A self-energizing seal is disposed between the end cap and the vessel body to seal them together. Preferably, the seal consists of a C-shaped polymeric body with a stainless steel spring or an O-ring in the middle. The spring pushes two lips of the seal out. One lip of the seal touches the body of the vessel and the other lip of the seal touches the cap. When the pressure inside the vessel increases, it acts against the seal and pushes the lips even further towards the wall. In order to eliminate bolts, the cap can be threaded to the vessel body. The threads provide an additional bonus in that a simpler motor mechanism can feed the cap into the vessel thereby providing an automated method of opening and closing the vessel. This simple automation provides considerable amount of safety to the operator. A seal retainer can be used to hold the seal from moving. The seal retainer can be designed to do more than one function. For example, it can be designed to hold a frit to retain any solids from entraining, act as a flow distributor and hold the seal in the right place.

7 Claims, 3 Drawing Sheets

PRESSURE VESSEL SEAL WITH SELF-ENERGIZING SEAL

This is a continuation application of patent application Ser. No. 08/734,406 filed Oct. 16, 1996, now abandoned, which is a continuation application of Ser. No. 08/175,966 filed Dec. 30, 1993, now abandoned.

FIELD OF THE INVENTION

The present invention relates generally to pressure vessels. More particularly, the present invention relates to a pressure vessel with an easy to open and close end closure.

BACKGROUND OF THE INVENTION

Current available extraction methodologies for the extraction of additives from natural products is time consuming, labor intensive and costly. These extraction processes use hydrocarbon solvents such as methylene chloride, which are considered to be carcinogenic substances. The U.S. Environmental Protection Agency (EPA) is actively working to eliminate methylene chloride from all laboratories and the Occupational, Safety and Health Administration (OSHA) has considerable restrictions dictating its use and emissions. Moreover, hydrocarbon solvent is expensive, requires vacuum distillation to remove it from the extracted compounds, and the extraction plant needs to be explosion proof. A fairly new process, supercritical fluid extraction (SFE), is safe for personnel, meets both OSHA and EPA requirements, uses inexpensive solvent, thus cost effective, and does not require an explosion proof plant would be practical and very useful.

Supercritical fluid extraction is a good potential solution to this problem because: 1) SFE is an extraction technique that is very fast due to its high mass transfer coefficient, 2) SFE can be selective by manipulating the temperature and pressure and thus has the potential to eliminate the additional sample clean-up steps after the extraction, 3) SFE is versatile because of its wide applicability, 4) SFE uses carbon dioxide which is a non-toxic, harmless fluid which eliminates the use of large volumes of toxic liquid solvents, such as methylene chloride or other chlorinated solvents, and 5) SFE replaces a number of energy intensive steps such as vacuum distillation.

Supercritical fluid technology has numerous applications in regard to food, pharmaceuticals and the environment. The same equipment is flexible enough to be used for more than one application with little modification. Its applications include: removal of solvents from paints, inks and chemical wastes; elimination of the need for freons; removal of PCB's and pesticides from soil; reduction of radioactive wastes, extraction of spices, flavors and fragrances, separation of polymers, separation of enantiomers, etc.

However, the biggest challenge in the SFE technology is in the area of equipment cost. Most of the current applications for SFE are in the food industry since extraction processes uses carbon dioxide which is physiologically compatible and nontoxic to the human body. Good Manufacturing Practices (GMP) and the Food and Drug Administration (FDA) regulations require the use of stainless steel for use with food applications. Typical pressures of 5–10,000 psia during extraction mandate the extraction system follow ASME regulations for high pressure. The use of high pressure stainless steel vessels results in capital costs in hundreds of thousands to millions of dollars depending on capacity of the plant. The prices for a 10 liter plant is around $100,000, for a 100 liter plant around $500,000 and for a 500 liter plant around $2.0 million dollars.

This high capital cost has negated the advantages of SFE and relegated its use to only niche applications in the food industry. Even though the applications for SFE are considerable, only a few plants exist in the world for use only for very high value items such as decaffeination of coffee, removal of nicotine from tobacco, and hops extraction. Reduction of capital cost for SFE could increase the market by at least one order of magnitude. Examples of applications which could use these plants in large numbers are extraction of vegetable oil, removal of cholesterol from eggs and dairy products, processing of pharmaceuticals and polymer, demilitarization of explosives, decontaminating drilling muds at off-shore rigs, etc. A multi-million dollar business in SFE is a very achievable goal subject to reduction in capital costs.

Since, the extraction vessels represents a significant portion of the overall cost of a supercritical fluid system. The various issues related to the vessel design are:

1. Durable seals for repeated opening and closing
2. Light weight
3. Low expense Traditional designs involves the use of a vessel with flanges. These flanges have holes in them where bolts are used to hold the cap and the vessel together with an O-ring or a gasket in between the cap and the vessel flanges. This type of system is labor intensive to open or close and cannot be automated easily and cause considerable amount of process down time.

The present invention shows that self-energized seals provide an effective seal requiring very minimal force.

SUMMARY OF THE INVENTION

The present invention is a pressure vessel device. The device is comprised of a vessel body having an open end. The device also comprises an end cap disposed on the open end of the body. A self-energizing seal is disposed between the end cap and the vessel body to seal them together.

Preferably, the seal consists of a C-shaped polymeric body with a stainless steel spring or an O-ring in the middle. The spring pushes a first lip and a second lip of the seal outwards. One lip of the seal touches the body of the vessel and the other lip of the seal touches the cap. When the pressure inside the vessel increases, it acts against the seal and pushes the lips even further towards the wall.

In order to eliminate bolts, the cap can be threaded to the vessel body. The threads provided an additional bonus in that a simpler motor mechanism can feed the cap into the vessel thereby providing an automated method of opening and closing the vessel. This simple automation provides considerable amount of safety to the operator. A seal retainer can be used to hold the seal from moving. The seal retainer can be designed to do more than one function. For example, it can be designed to hold a frit to retain any solids from entraining, act as a flow distributor and hold the seal in the right place.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
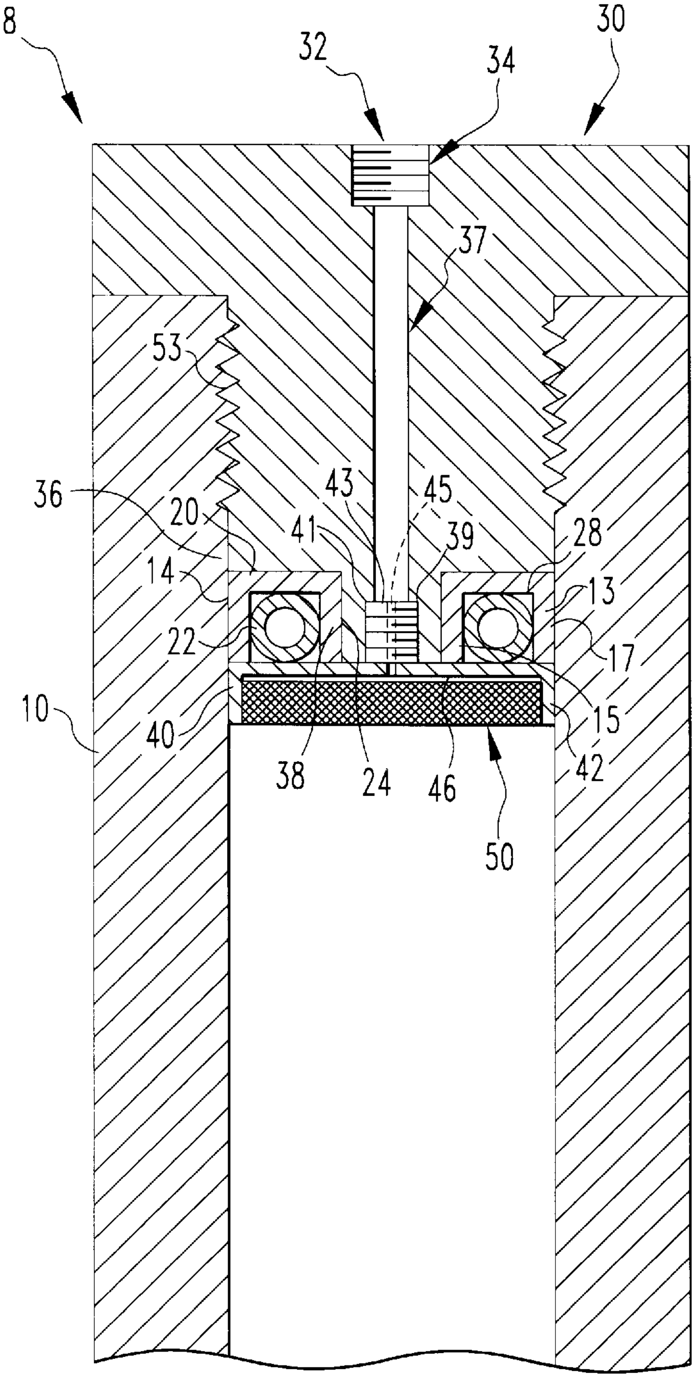
FIG. 1 is a schematic representation showing a cross sectional view of the pressure vessel device.
Figure 2:
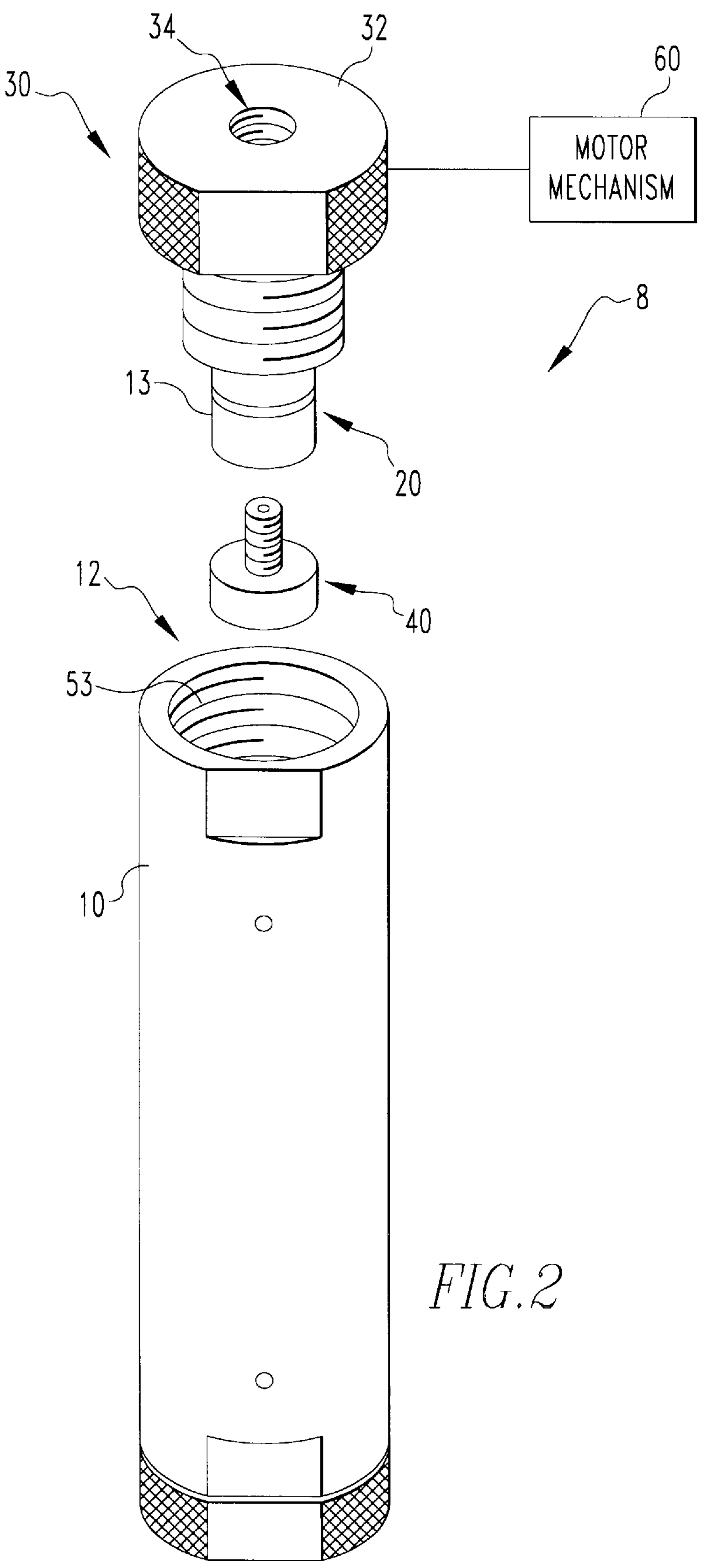
FIG. 2 is a schematic representation showing a perspective view of the pressure vessel device.

Referring now to the drawings wherein like reference numerals refer to similar or identical parts throughout the several views, and more specifically to FIGS. 1 and 2 thereof, there is shown a pressure vessel device 8. The pressure vessel device 8 comprises a vessel body 10 having an open end 12. There is also a cap 30 having a self-energizing seal 20. The seal 20 preferably comprises a seal member 13 having two lips 15 and 17 which form a C-shaped cross section, and a spread member 22 such as a spring that can exert force against the lips 15 and 17. The seal 20 can also include a seal retainer 40 and frit 50 that acts as a flow distributor and also retains solid material inside the body 10.

In a preferred embodiment, the cap 30 has a port 32 with a thread 34 at the end connected to a channel 37 for fluid to flow in and out of the cap 30 and thus inside of the vessel body 10, and a portion 36 where the seal 20 sits and where the internal surface 24 of the seal 20 touches the surface 38 of cap 30. This surface 38 should be extremely smooth and hard to decrease friction and increase the life of the seal 20. The device 8 can also have means for automatically opening and closing the end cap 30 from the vessel body 10. For instance, the automatic opening and closing means can include a motor mechanism 60 for unscrewing and screwing the end cap 30 onto the vessel body 10. The motor mechanism 60 can be attached to the end cap 30 in any preferable manner. For instance, a shaft extending from the motor would stay attached to the end cap 30. The motor would spin the shaft which would spin the end cap 30 either on or off. The spinning movement of the shaft would lift the shaft and the end cap completely off the vessel body 10.

The seal retainer 40 preferably consists of a tapered surface 42 where the frit 50 is pressed. The tapered surface 42 allows for any tolerances in the frit 50 or in the seal retainer 40. The frit 50 sits above the end of the seal retainer 40 creating a small gap 46 which acts as a flow distributor. Once the seal 20 is slipped on to the cap 30, the seal retainer 40 along with the frit 50 is screwed onto the cap 30, preferably, in second gap 39 having a second thread 41. The seal retainer 40 has a stem 43 with a stem channel 45 extending through the seal retainer 40 so fluid can flow in and out of the inside of the vessel body 10 to the channel 37.

Figure 3:
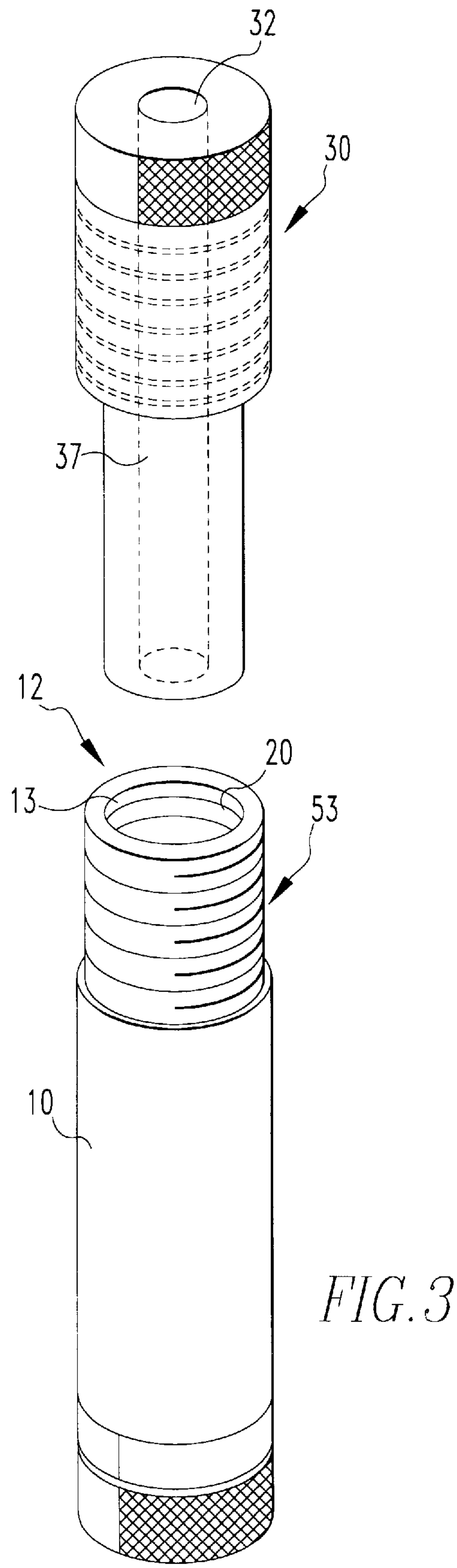
FIG. 3 is a schematic representation showing an embodiment of the pressure vessel device with the vessel body having external threading.

The threading 53 of the vessel body 10 can be on the inside or the outside. In the embodiment shown in FIGS. 1 and 2, the threading 53 is on the inside. In an alternate embodiment, and as shown in FIG. 3, the threading 53 on the vessel body 10 is on the outside of the vessel body 10. The seal 20 can be inserted inside the vessel body 10 instead of slipped over the cap 30.

In the operation of the invention, the cap 30 along with the seal 20 and the seal retainer 40 with the frit 50, is screwed onto the vessel body 10 at the end 12. As the cap 30 is screwed in, the seal 20 comes into contact with the vessel body 10. The seal surface 14 has to be very smooth and hard to decrease friction and increase the life of the seal 20. As the cap 30 is screwed in, the seal 20 comes into contact with the cap 30 at seal surface 38. The seal surface 38 and 14 have to be very smooth and hard to decrease friction and increase the life of the seal. Once the seal 20 has come into full contact with seal surfaces 14 and 38, fluid can be introduced through the ports 32. The spring member 22 initially provides the force for the seal 30 to seal on the surfaces 14 and 38. As the pressure increases, the fluid flows into the seal groove 28 and provides the force for the seal 20 to seal against the seal surfaces 14 and 38.

The vessel body 10 can have one or two end caps 30 and associated seals 20. The ports 32 can be on the same side as the cap 30 or can be on either end.

The following are preferred ranges of specifications:

Vessel Size: 1 ml to 1000 liters or greater

Vessel ID: 3 mm to 1 meter or greater

Pressure Rating: from 10 atm to 1500 atm

Temperature: Up to 300° C.

Seal Material: virgin or modified fluorocarbons, UHMW PE or other polymers

Metal Body: any stainless or any alloy steel, heat treated if necessary

Polymeric Body: Most polymers

Frit: 0.5 to 100 micron, stainless steel or any other material

Port: most types from NPT, CPI to high pressure cone and threaded

The following are some specific embodiments:

EXAMPLE 1

Vessel Size: 1 ml

Vessel ID: 10 mm

Seal: Spring loaded graphite reinforced teflon

Material: 17-4 PH high strength SS, heat treated to H1150

Frit: 2 micron, stainless steel

Port: 1/16" CPI fitting

Caps: Both sides

EXAMPLE 2

Vessel Size: 1 liter

Vessel ID: 3.000 inches

Seal: Spring loaded graphite reinforced teflon

Material: SS316

Frit: 5 micron, stainless steel

Port: ¼" NPT on the top and the bottom

Cap: Only on one side

EXAMPLE 3

Vessel Size: 8 liters

Vessel ID: 8 inches

Seal: Spring loaded graphite reinforced teflon

Material: 17-4 PH high strength SS, heat treated to H1150

Frit: 5 micron, stainless steel

Port: ¼" NPT

Cap: Only one side

An 8 liter vessel with the following specifications was built:

Design Pressure: 500 atm

Volume 8 liters

Closures: Finger Tight

Temperature 100° C.

The pressure vessel device 8 was hydrostatically tested to 11,200 psia which is 1.5 times the design pressure as per ASME requirements. The vessel body 10 expanded by 0.005" and was well within the predicted expansion of about 0.009". There was no permanent expansion since dropping the pressure eliminated the expansion. This implies that the expansion was still in the elastic range.

To ensure adequate safety measures, relief holes can be incorporated into the cap 30 for the gas to leak and not put additional pressure on the threads. The vessel body 10 can be fitted with special strain gauges to monitor the internal pressure in case of a failure by a pressure sensor and accidental opening of the cap 20 with still pressure inside. This non-invasive measurement of pressure is critical for safe operation.

The present invention is also a method comprising the step of attaching an end cap 30 onto a vessel body 10 such that a self-energizing seal 20 seals between the end cap 30 and the vessel body 10. Then, there is the step of pressurizing the vessel body such that the self-energizing seal 20 is caused to provide a seal force between the end cap 30 and vessel body 10 which increases with increasing pressure.

The vessel 10 can be used for supercritical fluid extraction and the pressurizing step includes the step of introducing supercritical fluid into the vessel body 10. Preferably, before the sealing step, there is the step of disposing a material within the vessel body 10.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A pressure vessel device comprising:

a vessel body having a central axis, a chamber and an open end that communicates with the chamber;

an end cap which fits over the open end to engage the vessel body and close the open end, said end cap having a seal groove; and a self-energizing seal means disposed between and in contact with the end cap and the vessel body in the seal groove for sealing the end cap with the vessel body as pressure increases in the vessel body, said self-energizing seal means having an inner lip and an opposing outer lip, said inner and outer lips in parallel with the central axis, said inner lip contacting the end cap, said outer lip contacting the vessel body, said inner and outer lips being spread apart from each other and against the end cap and vessel body, respectively, as pressure increases in the vessel body, said seal means having a spring disposed between the inner and outer lips to bias the lips against the end cap and vessel body, respectively, said seal means having a seal retainer in contact with the inner and outer lips and the vessel body and the end cap, and a frit in contact with the seal retainer that acts as a flow distributor and retains solids in the chamber.

2. A device as described in claim 1 wherein the open end has a threaded portion and the end cap has threading for threadingly engaging with the threaded portion of the open end.

3. A device as described in claim 2 wherein the seal member is comprised of a polymeric material.

4. A device as described in claim 3 wherein the seal member is comprised of modified fluorocarbons.

5. A device as described in claim 1 wherein the end cap has a passage running through it and a port for fluidically connecting with the passage.

6. A device as described in claim 1 including means to automatically open and close the end cap from the body.

7. A device as described in claim 6 wherein the automatic opening means comprises a motor mechanism for unscrewing the end cap from the body.

* * * * *